US008655333B2

(12) United States Patent
Newton et al.

(10) Patent No.: US 8,655,333 B2
(45) Date of Patent: Feb. 18, 2014

(54) METHODS, SYSTEMS, AND COMPUTER PROGRAM PRODUCTS FOR ESTABLISHING SETTINGS OF COMMUNICATIONS SERVICE FEATURES

(75) Inventors: Gregory Newton, Dunwoody, GA (US); Phillip Weeks, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 837 days.

(21) Appl. No.: 11/411,190

(22) Filed: Apr. 25, 2006

(65) Prior Publication Data

US 2007/0061736 A1 Mar. 15, 2007

Related U.S. Application Data

(60) Provisional application No. 60/717,214, filed on Sep. 15, 2005.

(51) Int. Cl.
*H04M 3/00* (2006.01)
(52) U.S. Cl.
USPC ........ 455/418; 455/414.1; 455/419; 455/420; 709/227; 709/228; 709/229
(58) Field of Classification Search
USPC .......................................................... 455/418
See application file for complete search history.

(56) References Cited

U.S. PATENT DOCUMENTS

| 6,549,612 | B2 * | 4/2003 | Gifford et al. | 379/67.1 |
| 7,272,662 | B2 * | 9/2007 | Chesnais et al. | 709/246 |
| 2002/0110231 | A1 * | 8/2002 | O'Neal et al. | 379/201.01 |
| 2004/0002329 | A1 * | 1/2004 | Bhatia et al. | 455/422.1 |
| 2004/0255271 | A1 * | 12/2004 | Lim | 717/110 |
| 2005/0198164 | A1 * | 9/2005 | Moore et al. | 709/206 |
| 2005/0216949 | A1 | 9/2005 | Candelora et al. | 725/134 |
| 2005/0220286 | A1 | 10/2005 | Valdez et al. | 379/211.02 |
| 2005/0262204 | A1 * | 11/2005 | Szeto et al. | 709/206 |
| 2006/0056613 | A1 * | 3/2006 | Kim et al. | 379/201.02 |

OTHER PUBLICATIONS

News Release "Critical Path's Extensible Universal Address Book Provides Foundation for New Value-Added Services for Carriers" http://www.criticalpath.net/en/76/pressreleases/?news=498105, Feb. 24, 2004.
SipStorm: Reinventing Communications, http://www.sipstorm.com/products.htm, 2004, 2 pages.
SipStorm: Reinventing Communications, http://www.sipstorm.com/products.htm?i=3, 2004, 2 pages.

* cited by examiner

*Primary Examiner* — Charles Appiah
*Assistant Examiner* — Mazda Sabouri
(74) *Attorney, Agent, or Firm* — Myers Bigel Sibley & Sajovec

(57) ABSTRACT

Establishing settings of communications service features for a user includes identifying a plurality of communications services of the user. The plurality of communications services include wireline phone service, cellular phone service and/or electronic mail (e-mail) service. A plurality of user selectable communications service scenarios for the user are defined. Settings for the plurality of communications services to be applied for the user upon selection of one of the scenarios are established. A selection of one of the scenarios is received. The current settings of the communications service features for the user are automatically changed to the established settings for the selected one of the scenarios responsive to receiving the selection of the one of the scenarios.

18 Claims, 12 Drawing Sheets

METHODS, SYSTEMS, AND COMPUTER PROGRAM PRODUCTS FOR ESTABLISHING SETTINGS OF COMMUNICATIONS SERVICE FEATURES

CROSS REFERENCE TO RELATED APPLICATION

This Application is related to and claims the priority of U.S. Provisional Patent Application Ser. No. 60/717,214, filed Sep. 15, 2005, entitled Systems and Methods for Providing a Feature Management Interface, the disclosure of which is hereby incorporated herein by reference.

BACKGROUND

The present invention generally relates to the field of communications services and, more particularly, to user interfaces for communications services.

A wide variety of communications services are available for users. For example, a single user may have a home phone, work phone, and mobile phone. In addition, the user may also use devices such as PC's, PDA's, and pagers for data communications, such as e-mail and instant messaging.

As communications services develop they offer more functionality and options. As a result, they are becoming more complex to use and manage. For example, a person could use a home phone, cellphone, work phone, e-mail, work e-mail and the like as communications services for different purposes or at different times. In addition, a number of phones and computers could be included in a home or office, thereby providing access to those communications services from different locations in the home or office. Different addresses or identifications could be associated with each of these phones and/or computers or other user input/output devices that may be used in connection with the communications services.

Each of the services and/or devices will typically have its own associated set of features and settings. Managing all these options may be so complicated and annoying for a user, that users may forego taking full advantage of all the features available to them. As such, they may perceive the provided services as less valuable and less desirable. They may also fail to add new premium services associated with the services because of a perceived inability to take advantage of those premium services. Therefore, the ability to market communications services may be adversely affected.

SUMMARY

In some embodiments, establishing settings of communications service features for a user includes identifying a plurality of communications services of the user. The plurality of communications services include wireline phone service, cellular phone service and/or electronic mail (e-mail) service. A plurality of user selectable communications service scenarios for the user are defined. Settings for the plurality of communications services to be applied for the user upon selection of one of the scenarios are established. A selection of one of the scenarios is received. The current settings of the communications service features for the user are automatically changed to the established settings for the selected one of the scenarios responsive to receiving the selection of the one of the scenarios.

In further embodiments, establishing settings includes receiving a selection of one of the plurality of communications services and a designation of a profile to be associated with the selected one of the plurality of communications services to identify one of the user selectable communications service scenarios. A designation of user preferences for communications service features to be associated with the designated profile are received. The user preferences for the communications service features are translated to communications system settings affecting the plurality of communications services of the user to establish the settings for the plurality of communications services to be applied for the user upon selection of the one of the scenarios. One of the scenarios may be a default scenario having an associated default profile. The features may include call blocking, call filtering, call forwarding, voicemail and/or e-mail notification.

In other embodiments, receiving a selection comprises includes receiving a selection of a telephone number of a communications service of the user. A plurality of telephone numbers may be associated with communications services of the user and receiving a selection may include displaying a list of the plurality of telephone numbers and receiving a selection of one of the displayed telephone numbers. Receiving a designation of a profile may include displaying a list of profiles associated with the selected one of the displayed telephone numbers, an edit profile option and/or a new profile creation option.

In further embodiments, receiving a designation of user preferences for communications service features includes displaying a user input menu including an identification of available features and a narrative description of current settings associated with the designated profile. A designation of activation of a selected one of the available features and/or a designation of one of the available features to be edited is received. The selected one of the available features is activated responsive to a designation of activation of the selected one of the available features. A user input menu is displayed including user options associated with the designated one of the available features responsive to a designation of the one of the available features to be edited. A designation of a user option is received responsive to display of the user input menu including user options.

In yet other embodiments, the selected one of the available features is call filtering and the user options include designation of callers that will be announced to the user, designation of callers that will not be announced to the user and/or designation of callers to be associated with a group, wherein a group may be designated as a caller to be announced to the user and/or a caller that will not be announced to a user. The selected one of the available features may be call forwarding and the user options may include designation of callers that will be forwarded to an alternative phone number, designation of the alternative phone number, designation of a ring tone to generate for forwarded calls and/or designation of callers to be associated with a group, wherein a group may be designated as a caller to be forwarded to the alternative phone number. The alternative phone number may be a plurality of alternative phone numbers. The alternative phone number may be a plurality of voice over Internet protocol (VoIP) devices mapped to a same phone number. The selected one of the available features may be e-mail notifications and the user options may include designation of an e-mail address for e-mail notifications, designation of callers that will trigger an e-mail notification and/or designation of callers to be associated with a group, wherein a group may be designated as a caller that will trigger an e-mail notification. An e-mail notification may be generated responsive to receipt of a call from a designated caller and/or responsive to receipt of a voicemail.

In further embodiments, defining a plurality of user selectable communications service scenarios and establishing settings includes automatically detecting a pattern in a users usage of the plurality of communications services of the user corresponding to one of the communications service scenarios for the user. A designation of user preferences for communications service features to be associated with a profile to be associated with the one of the scenarios is proposed based on the detected pattern. An acceptance of the proposed designation of user preferences is received and the proposed designation of user preferences for the communications service features is translated to communications system settings affecting the plurality of communications services of the user to establish the settings for the plurality of communications services to be applied for the user upon selection of the one of the scenarios.

In other embodiments, computer systems for establishing settings of communications service features for a user include a service coordination module configured to identifying a plurality of communications services of the user, the plurality of communications services including wireline phone service, cellular phone service and/or electronic mail (e-mail) service. The systems further include a feature management interface module configured to define user selectable communications service scenarios for the user, establish settings for the plurality of communications services to be applied for the user upon selection of one of the scenarios and receive a selection of one of the scenarios. The service coordination module is configured to automatically change current settings of the communications service features for the user to the established settings responsive to receiving the selection of the one of the scenarios.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF EMBODIMENTS OF THE INVENTION

Figure 1:
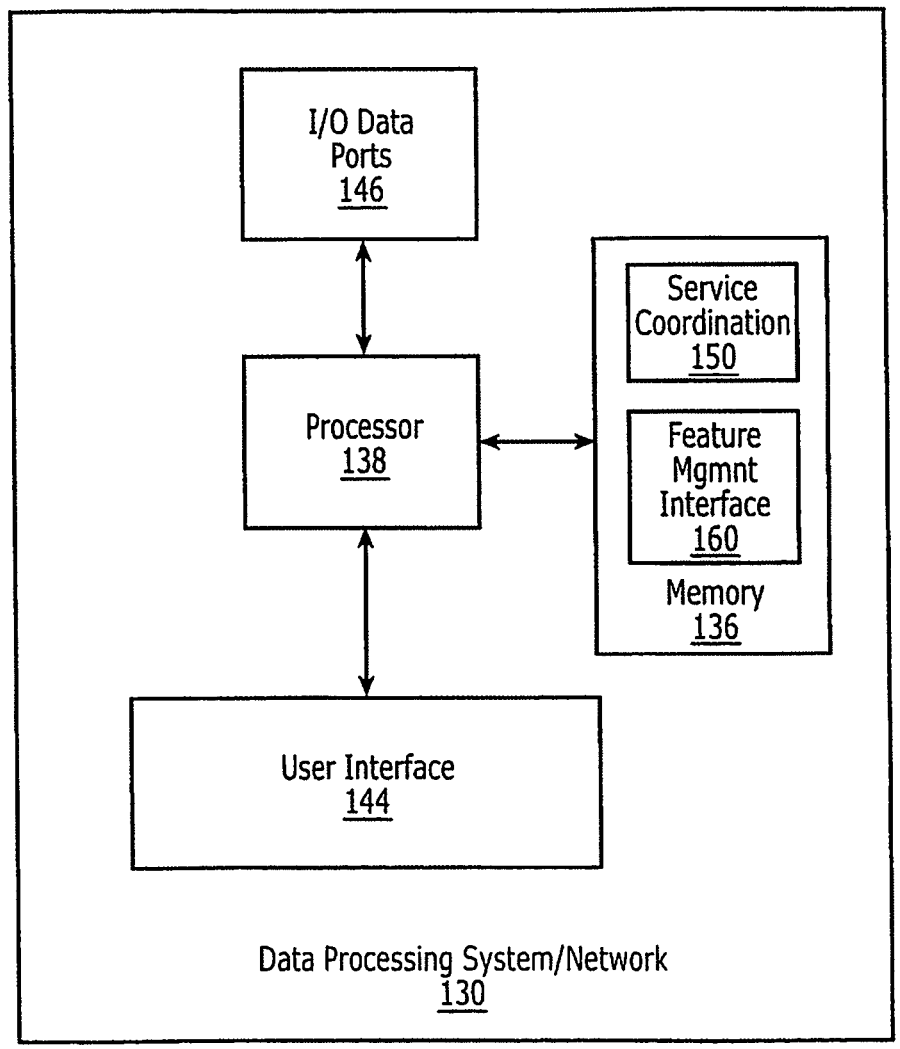
FIG. 1 is a block diagram of a data processing system suitable for use in some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware or in a combination of hardware and software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus or device. More specific examples (a nonexhaustive list) of the computer-readable medium would include the following: a portable computer diskette, a random access memory (RAM), a read-only memory (ROM), an erasable programmable read-only memory (EPROM or Flash memory) and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In some embodiments of the present invention, creating an easy to use and navigate feature management interface for establishing communications service features for a user may ease the burden on the user in managing those communications services. In some embodiments, the user may provide input as to what they want to happen in several scenarios and the interface interprets the input and configures all the appropriate features and settings accordingly. In this way, the user may get the most functionality out of their services with a minimum of hardship. The consumer's usage data may also be monitored and patterns may be recognized in usage, which patterns may be used to suggest changes to features based on the recognized usage patterns in some embodiments.

The present invention is described below with reference to block diagrams and/or flowchart illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Referring now to FIG. 1, an exemplary embodiment of devices, for example, an application server (AS) or the like or other data processing system 130 configured in accordance with some embodiments of the present invention will be discussed. The data processing system 130, which may be incorporated in, for example, a personal computer, a PDA, a wireless terminal/phone, or the like, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network that may be associated with a communications service provider or user communication devices using, for example, an Internet Protocol (IP) connection. These components may be conventional components such as those used in many conventional data processing systems, which may be configured to operate as described herein.

As shown in the embodiments of FIG. 1, the memory 136 includes a service coordination module 150 and a feature management interface module 160. The service coordination module 150 and/or feature management interface module 160 may be implemented, for example as part of the operating system, as application programs, as components of a dynamic link library or the like of the data processing system 130 so as to be executed by the processor 138.

The service coordination module 150 may be configured to identify a plurality of communications services of the user. The plurality of communications services may include wire line phone service, cellular phone service and/or electronic mail (e-mail) service. It will be understood that, as used herein, electronic mail or e-mail refers to text based communications services and may include text based services such as multimedia message service (MMS) and/or short message service (SMS) or like services that may be provided, for example by a cellular phone service provider, as well as IP address based e-mail. The feature management interface module 160 may be configured to define user selectable communications service scenarios for the user. The feature management interface module 160 may further be configured to establish settings for the plurality of communications services to be applied for the user upon selection of one of a plurality of communications service scenarios for the user and to receive a selection of one of the scenarios. The service coordination module 150 may be configured to automatically change current settings of the communications service features for the user to the established settings responsive to receiving the selection of one of the scenarios.

Figure 2:
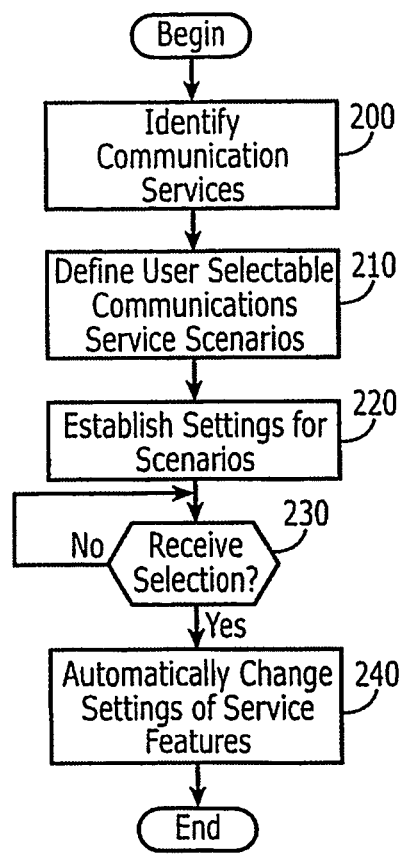
FIGS. 2-5 are flowcharts illustrating operations for setting communications service features for a user according to some embodiments of the present invention.

A computer implemented method of establishing settings of communications service features for a user according to some embodiments of the invention will now be described with reference to the flow chart illustration of FIG. 2. As shown for the embodiments of FIG. 2, operations begin by identifying a plurality of communications services of the user (block 200). The plurality of communications services includes wire line phone service, cellular phone service and/or electronic mail (e-mail) service. A plurality of each type of such communications service may be provided where, for example, different telephone numbers or Internet protocol (IP) addresses are associated with different ones of the services.

A plurality of user selectable communications service scenarios are defined for the user (block 210). Such scenarios may include, for example, do not disturb, vacation, eating, or the like. In some embodiments, one of the scenarios is a default scenario having an associated default profile. The default scenario may correspond to an initial state of the features of a communications service when first acquired by the user and/or may be defined by a user as the settings of features to be used when no other scenario has been selected by the user.

Settings for the plurality of communications services that are to be applied for the user upon selection of respective ones of the scenarios are established (block 220). A selection of one of the scenarios is received (block 230). When a selection has been received, the current settings of the communications service features for the user are automatically changed to the established settings for the selected one of the scenarios responsive to receiving the selection of one of the scenarios (block 240).

Figure 3:
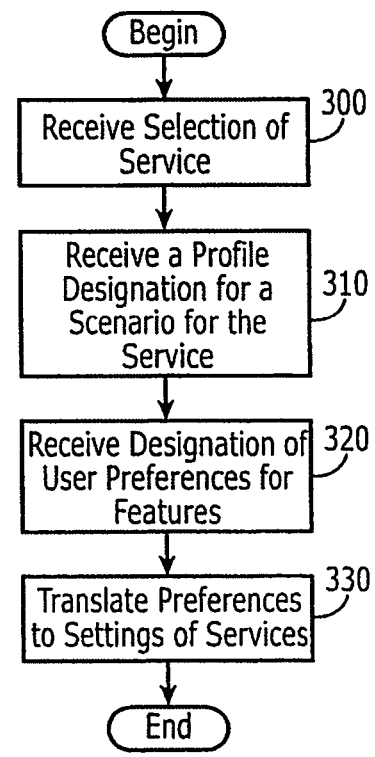

Operations for establishing settings at block 220 according to some embodiments of the present invention will now be further described with reference to the flowchart illustration of FIG. 3. As shown in the embodiments of FIG. 3, a selection of one of a plurality of communications services is received (block 300). A designation of a profile to be associated with the selected one of the plurality of communications services to identify the user selectable communications service scenario is received (block 310). For example, a user establishing settings of the features of various communications services for when they are on vacation may designate a scenario as "vacation" at block 310.

A designation of user preferences for communications service features to be associated with a designated profile is received (block 320). The user preferences for the communications service features are translated to communication system settings affecting the plurality of communications services of the user to establish the settings for the plurality of communications services to be applied for the user upon selection of the scenario (block 330). Operations at blocks 300-330 may be repeated to create and define additional settings for different scenarios. For example, a user leaving on vacation may wish to create a profile that will cause incoming phone calls to a home wire line telephone number to be forwarded to the user's wireless cellular phone service rather than ringing through to phones of the home wire line service. The service provider supporting the wire line telephone service may then be provided the user's preference regarding such call forwarding and the destination number for call forwarding and may implement the request with the appropriate settings in the call routing protocol of the service provider to implement the desired call handling in the selected scenario for the user.

As noted above, ones of the communications services of the user may be associated with a telephone number, Internet address or the like. Accordingly, operations at block 300 may include receiving a selection of a telephone number of a communications service of the user. A user may have a plurality of telephone numbers associated with their communications services and receiving the selection may include displaying a list of the user's telephone numbers when receiving a selection of one of the displayed telephone numbers at block 300. Similarly, a designation of a profile may be received at block 310 by displaying a list of available profiles associated with the selected one of the displayed telephone numbers and receiving a selection of one of the listed items. The list of available profiles may also include an edit profile and/or a new profile creation option allowing editing of a selected one of the profiles to be used for the telephone number or creation of a new name profile to be associated with the telephone number for that communications service of the user. It will be understood that, while an example regarding call forwarding was used with reference to operations at block 330 above, the communications service may have a plurality of different features for which settings may be established, such as call blocking, call filtering, call forwarding, voicemail and/or e-mail notification.

Figure 4:
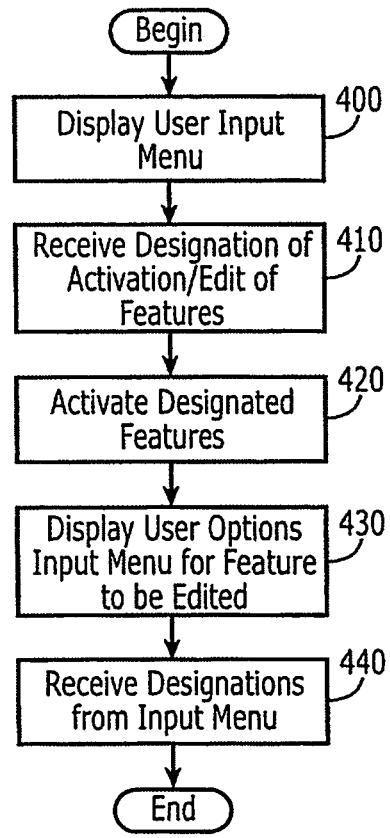

Operations for receiving a designation of user preferences for communications service features at block 320 according to some embodiments of the present invention will now be further described with reference to the flowchart illustration of FIG. 4. A user input menu is displayed including an identification of available features along with a narrative description of current settings associated with a designated profile (block 400). An example of such an input menu will be further described with reference to FIG. 6. A designation of activation of a selected one of the available features and/or a designation of one of the available features to be edited is received (block 410). When a designation of activation of one of the available features is received, the selected one of the available features is activated (block 420). When a designation of an available feature to be edited is received, a user input menu is displayed including user options associated with the designated feature (block 430). A designation of a user option is received responsive to display of the user input menu including the user options (block 440).

Figure 9:
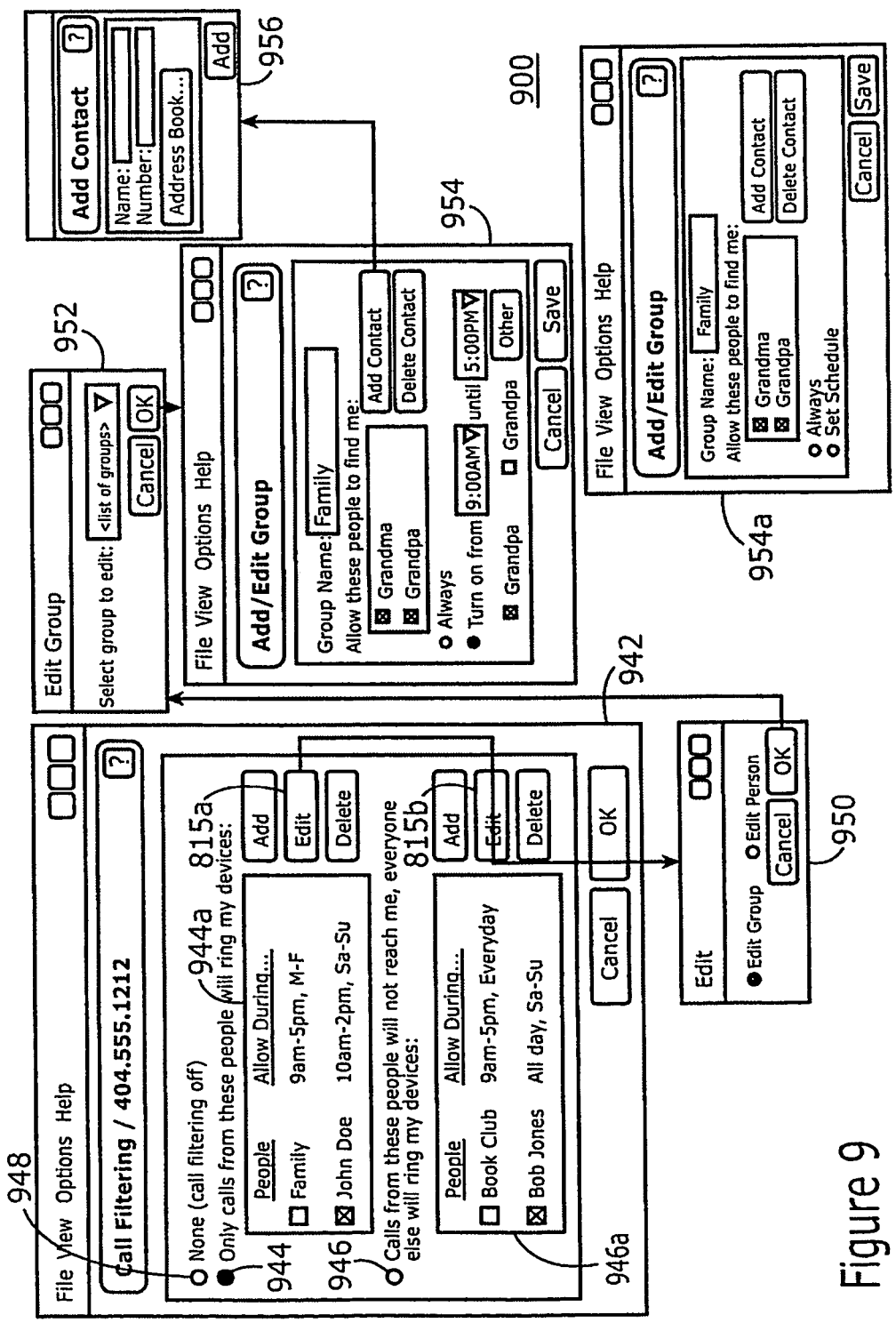

In some embodiments of the present invention where the selected one of the features is call filtering, the user option displayed at block 430 may include designation of callers that will be announced to the user, designation of callers that will not be announced to the user, and/or designations of callers to be associated with a group (see, e.g., FIG. 9). The group may be designated as a caller to be announced to the user and/or a caller that will not be announced to a user. In some embodiments where the selected feature is call forwarding, the user option displayed at block 430 may include a designation of callers that will be forwarded to an alternative phone number and/or a designation of the alternative phone number (see, e.g., FIG. 10). Designation of a ring tone to generate for forwarded calls and/or a designation of callers to be associated with a group, wherein the group may be designated as a caller to be forwarded to the alternative phone number may also be displayed options. The alternative phone number in some embodiments is a plurality of alternative phone numbers. In further embodiments, the alternative phone number is a plurality of voice over Internet protocol (VoIP) devices mapped to a same phone number.

In other embodiments where the selected feature is e-mail notification, the user options displayed at block 430 may include designation of an e-mail address for e-mail notification, designations of callers that will trigger an e-mail notification and/or designation of callers to be associated with a group, wherein a group may be designated as a caller that will trigger an e-mail notification (see, e.g., FIG. 1A). The e-mail notification may be generated responsive to receipt of a call from a designated caller and/or responsive to receipt of a voicemail.

Figure 5:
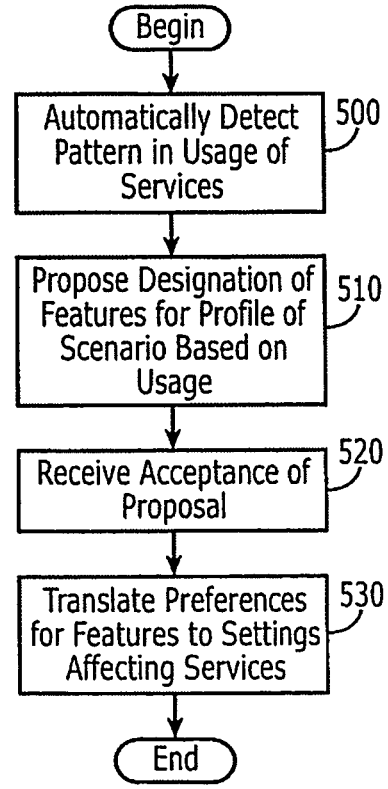

Operations for defining a plurality of user selectable communications service scenarios at block 210 and establishing settings at block 220 according to some embodiments of the present invention will now be further described with reference to the flowchart illustration of FIG. 5. As seen in the embodiments of FIG. 5, a user's usage of the plurality of communications services of the user corresponding to one of the communications service scenarios for the user may be automatically detected (block 500). A designation of user preferences for communications service features to be associated with a profile that is in turn associated with the scenario may be proposed based on the detected pattern (block 510). An acceptance of the proposed designation of user preferences may be received (block 520). However, it will be understood that prompting a user to accept a proposal may not be required in some embodiments of the present invention. The proposed designation of user preferences for the communications service features may be translated to communication system settings affecting a plurality of communications services of the user to establish the settings for the plurality of communications services to be applied for the user upon selection of the one of the scenarios (block 530). Thus, as described with reference to the embodiments of FIG. 5, user usage patterns of various communications services may be monitored to detect patterns that may indicate that a new scenario should be proposed to a user for future use. In addition, modifications to the user preferences for features to be applied for an already defined scenario may be proposed based on the user's actual experience during periods where the profile has been selected by the user.

Figure 6:
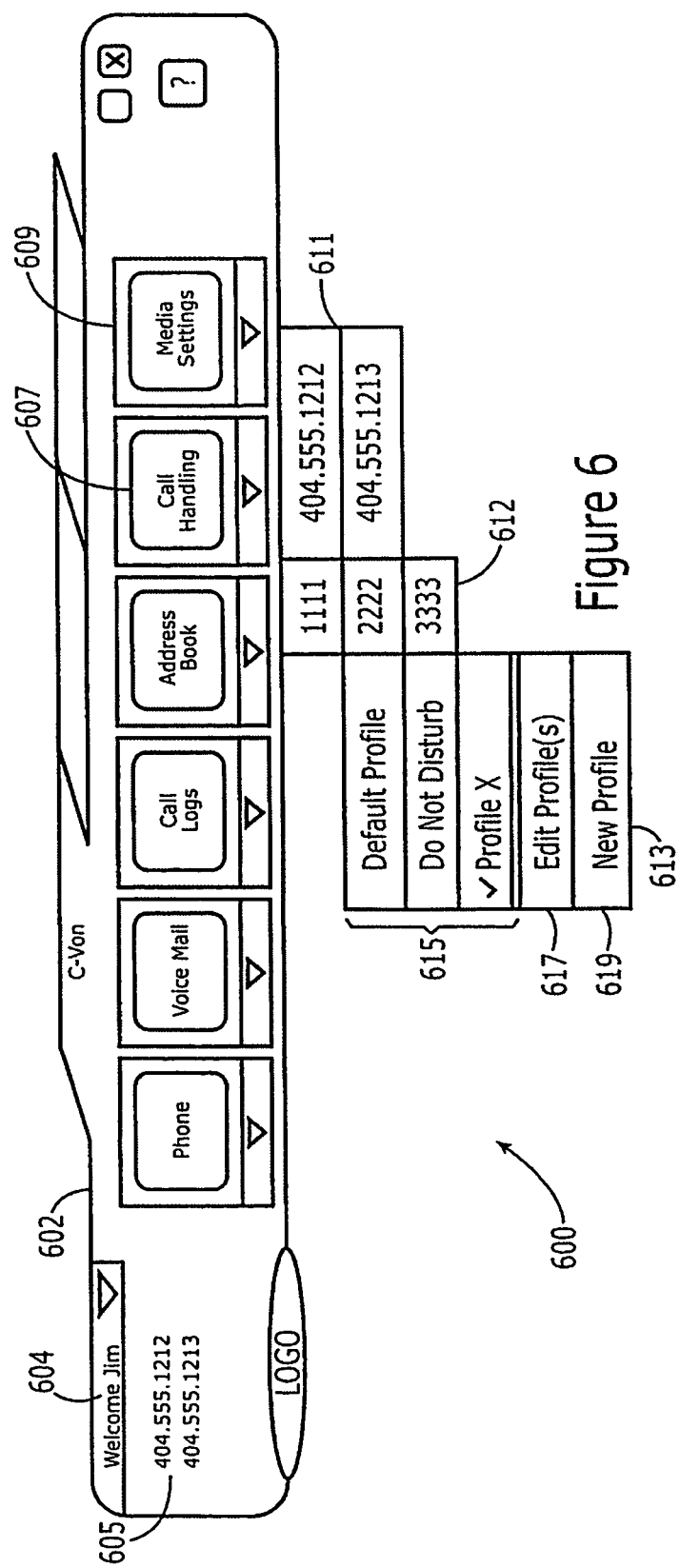
FIGS. 6-14 are schematic diagrams illustrating user interface screens and the use of the same in setting communications service features for a user according to some embodiments of the present invention.

User interface screens and operations associated with the use of the same in setting communications service features for a user according to some embodiments of the present invention will now be further described with reference to the schematic diagram illustrations of FIGS. 6-13. As shown in FIG. 6, a user setting main menu screen 600 may be provided including a service designation field 602 including a user greeting field 604 displaying a personalized greeting for a user and a communications services identifier field 605, shown in FIG. 6 as listing two telephone numbers associated with voice communications services of the user. A plurality of different selection fields may be provided shown as Phone, Voicemail, Call Logs, Address Books, Call Handling and Media Settings in FIG. 6. Only the Call Handling field 607 and the Media Settings field 609 will be further discussed herein. It will be further understood that the service designations field 602 may include screen selection tabs and different user input selection options may be provided responsive to a user moving a cursor or the like over an alternative tab and selecting different services.

As shown in the illustrative example of FIG. 6, when a user selects the Call Handling field 607, identification numbers associated with different communications services available for the user are displayed, here shown as phone numbers 611. When a user places a cursor over or selects one of the phone numbers 611, a plurality of different extensions 612 associated with the selected number 611 are illustrated as being displayed in a pull down box. For example, a family telephone line may have multiple associated extensions and each extension may be provided its own profile or profiles. As illustrated in the example of FIG. 6, three extensions 612 are shown and, when a user places a cursor over or selects one of the extensions 612, a pull down box 613 may be displayed listing available profiles and profile options. As shown in the illustrative embodiments of FIG. 6, the selected extension 612 has three named profiles 615, the current selected one of which, "Profile X," is shown as active by a checkmark next to the name of the active profile. The pull down box 613 shown in FIG. 6 further includes an Edit profile field 617 and New profile field 619. Thus, a change to an already defined profile may be instituted by a user selecting a different one of the available profiles 615. Furthermore, one of these existing profiles may be edited by selecting the Edit Profile field 617 or a new profile may be created by selecting the New Profile field 619.

Figure 7:
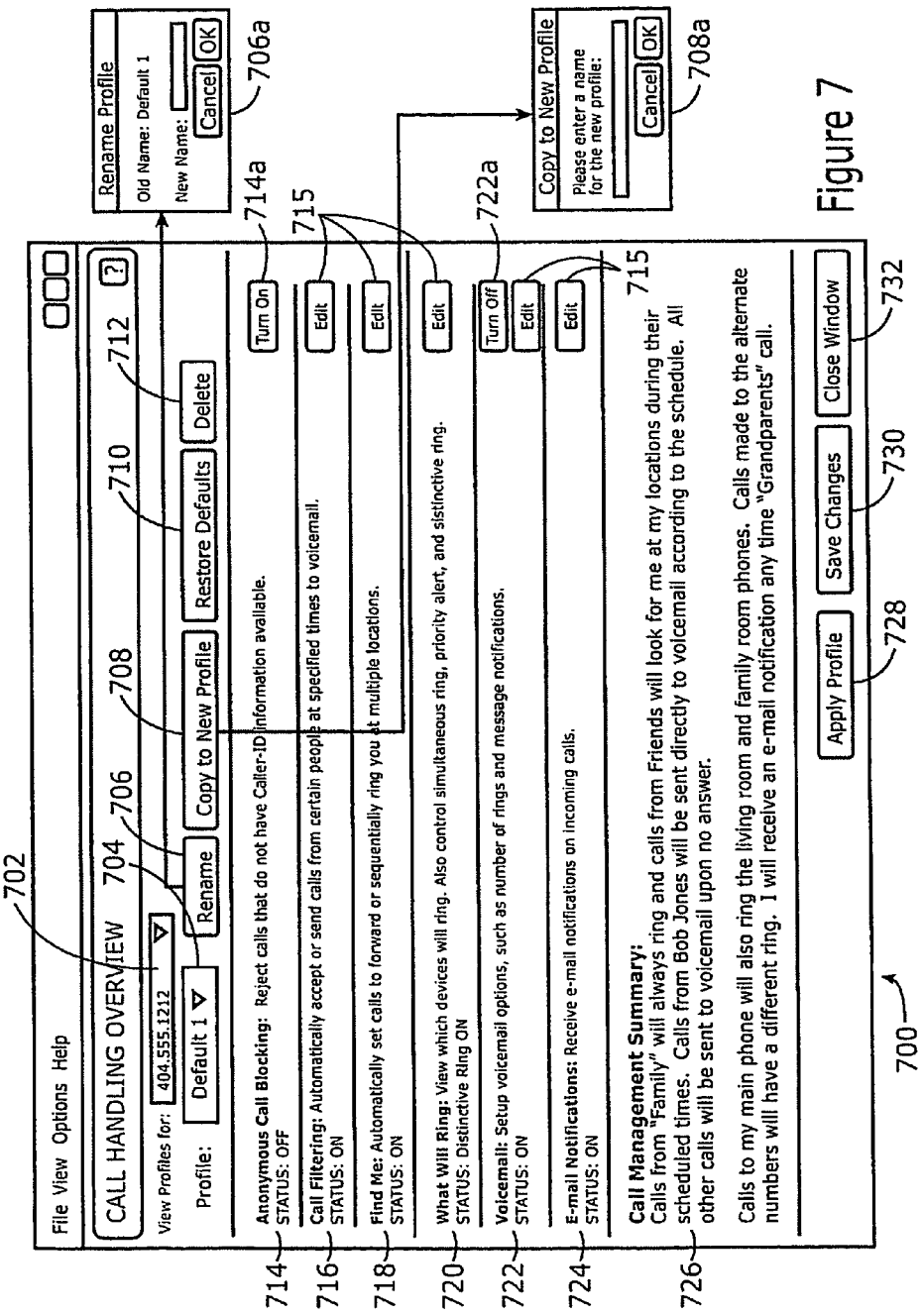

As shown in the schematic diagram of FIG. 7, upon selection of a profile for a communications service of a user, a Call Handling Overview 700 may be displayed. For example, as shown in the communications service Identification Number field 702 and the Profile Name field 704, FIG. 7 illustrates a Call Handling Overview 700 for telephone number 404.555.1212 for associated profile Default 1. User features selectable from the Call Handling Overview 700 include the Rename field 706, selection of which may lead to display of the Rename Profile display 706a allowing for entry and acceptance of a new name for the profile. Selection of the Copy to New Profile field 708 may lead to display of a Copy to New Profile screen 708a, allowing entry of a new name for a new profile. In other words, creation of a new profile may start by initially populating the settings for the various features with the settings already created for an existing profile rather than simply using default settings or leaving the settings in an indeterminate state pending user input.

Where a default profile is defined for the user, the Restore Default field 710 may be selected to automatically restore the settings of the currently displayed profile to the default settings. Finally, the Delete field 712 may be selected to delete the displayed profile.

With respect to the user input menu portions of the Call Handling Overview 700 specific to available user options associated with the selected telephone number, fields 714 through 724 are associated with different available features for the selected communications service associated with the selected telephone number and profile. The displayed feature user option input fields shown in FIG. 7 include a Call Blocking field 714, a Call Filtering field 716, a Find Me field 718, a What Will Ring field 720, a Voicemail field 722 and an E-mail Notification field 724.

In addition, for some embodiments of the present invention as shown in the Call Handling Overview 700, a plain text representation of the affect of the currently selected settings from the perspective of the user is generated and displayed in the Call Management Summary field 726. Providing the summary in the Call Management Summary field 726 may make it simpler for a user to understand the affect of the settings as selected by the user so they will be less likely to pick settings that fail to deliver the performance that was desired by the user. The summary provided in the Call Management Summary field 726 may also be beneficial for a user as various details of the effective settings, which would otherwise only be available by stepping through and viewing various different displays accessible through the Call Handling Overview 700, may be readily presented on a single screen without the need for further user knowledge of which different display selection fields need to be utilized or the need for the user to walk through multiple such interactions to obtain a desired summary of the settings of the currently selected profile. As a result, the simplicity of the user selection process for a user may be enhanced over time as profiles are established for different scenarios as a user may not need to remember all the details of each previously created profile as selection of the profile may generate a brief summary providing the user the information needed to determine an appropriate profile to select at any given point in time. The displayed summary may also facilitate a user identifying particular details that the user would like to change on the profile and which of the user option input fields to select to change the desired feature.

As shown in the embodiments of FIG. 7, the user option input fields 714-724 may vary in the available selection options for a user. For example, the Call Blocking field 714 is shown with a Turn-On (Off) field 714a so that Call Blocking can be turned on or off without a need to select and bring up a subsequent display. Similarly, the Voicemail field 722 includes a Turn-Off (On) field 722a. However, the Voicemail field 722, like the Call Filtering field 716, the Find Me field 718, the What Will Ring field 720 and the E-mail Notifications field 724 include an Edit field 715 that may be selected to bring up a subsequent display for user input and editing to change and/or establish features for the selected profile identified in field 704. Finally, an Apply Profile field 728, Save Changes field 730 and Close Window field 732 are shown in the Call Handling Overview 700 of FIG. 7, which may be selected to initiate operations corresponding to the descriptions of the respective fields.

Figure 8:
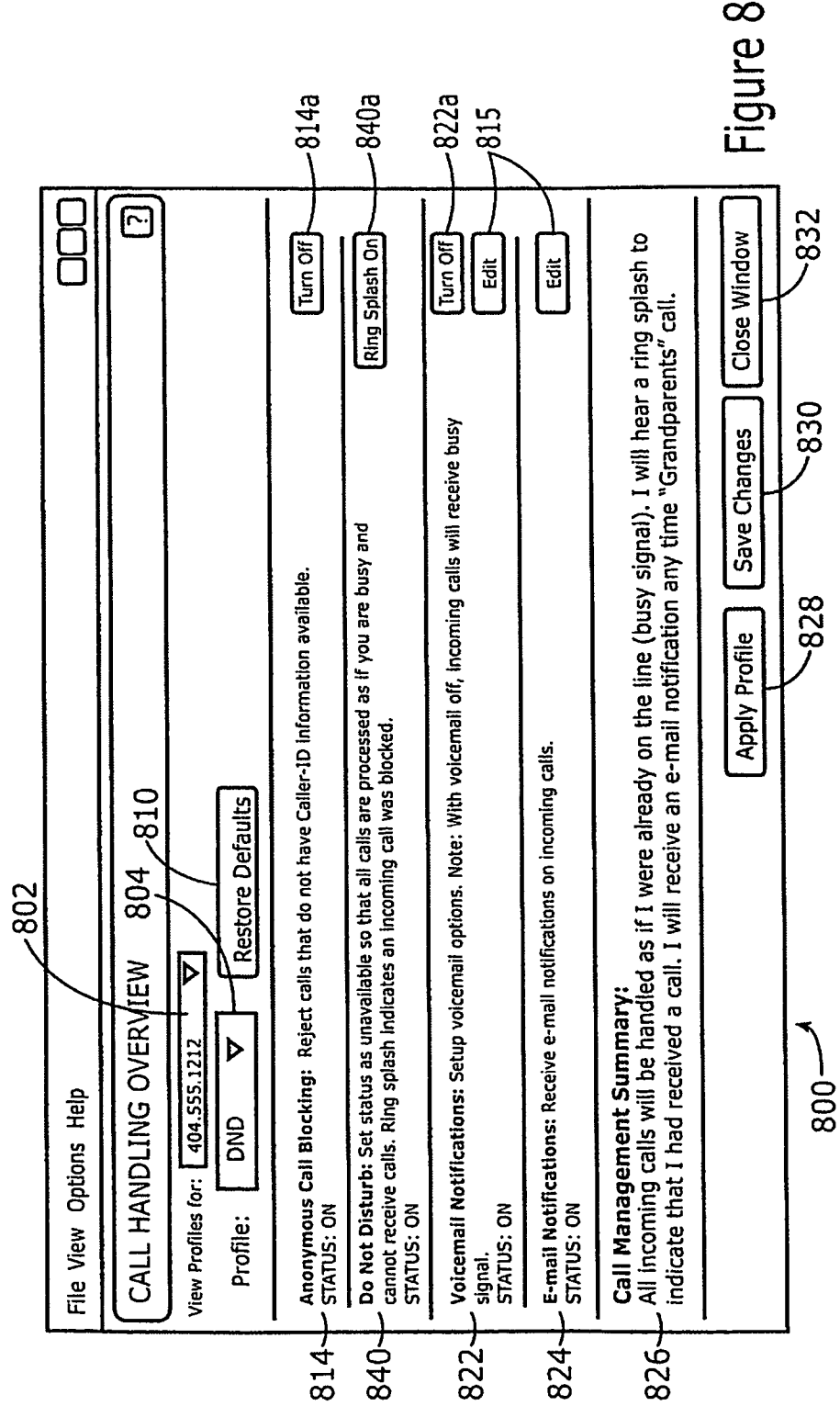

FIG. 8 is a schematic diagram illustrating another Call Handling Overview 800 associated with a communications service (404.555.1212) listed in an Identification Number field 802 and a profile (Do Not Disturb (DND)) for that communications service listed in a Profile Name field 804. The Call Handling Overview 800 differs in that, while a Restore Default field 810 is provided, Rename, Copy to New Profile and Delete are not shown as fields in the Call Handling Overview 800. In addition, available user option fields include a Call Blocking field 814, a Do Not Disturb field 840, a Voicemail Notifications field 822, and an E-mail Notifications field 824, ones of which have associated Turn-Off (On) fields 814a, 822a and/or Edit fields 815. As with the embodiments of FIG. 7, a Call Management Summary field 826 is provided as well as an Apply Profile field 828, Save Changes field 830, and a Close Window field 832. In addition, the Do Not Disturb field 840 is shown as having a Ring Splash On (Off) field 840a for requesting a ring splash indicating an incoming call was blocked when the ring splash is turned on.

An example of user interface screens generated responsive to user selection of the Edit field 715 in the Call Filtering field 716 will now be described with reference to the schematic illustration of FIG. 9. As shown in the embodiments illustrated in FIG. 9, when the Edit field 715 in the Call Filtering field 716 of FIG. 7 is selected, a Call Filtering display 942 is generated. The field 944 designating people whose incoming calls will ring to user's devices is selected is activated as shown in FIG. 9, which provides a display field 944a allowing selections of individual users or groups of users. In addition, Add and Delete fields as well as an Edit field 815 are available for user selection. Other options for selection in the user display 942 include a field 946 for specifying people whose calls will not reach the user and a field 948 for turning off call filtering.

When the Edit field 815a is selected for designating people to ring through, the user display 950 is generated to allow selection of Edit Group or Edit Individual. When Edit Group is selected, a user display 952 is shown allowing selection of the group to edit. After selection from the pull down menu of the group "Family," the user display 954 is generated allowing user editing of configuration information for the group "Family." As shown in user display 954, two persons, Grandma and Grandpa are included under the "Family" group name of the user at call number 404.555.1212 for weekdays between 9:00 a.m. and 5:00 p.m. User display 954*a* is a display where the "always find" selection is shown rather than a scheduled window limiting when call forwarding will find a user from the designated members of the group "Family." Also shown in FIG. 9, is a user display 956 that may be generated responsive to an Add Contact selection from the user interface 954 to add an additional person to the group "Family."

Figure 10:
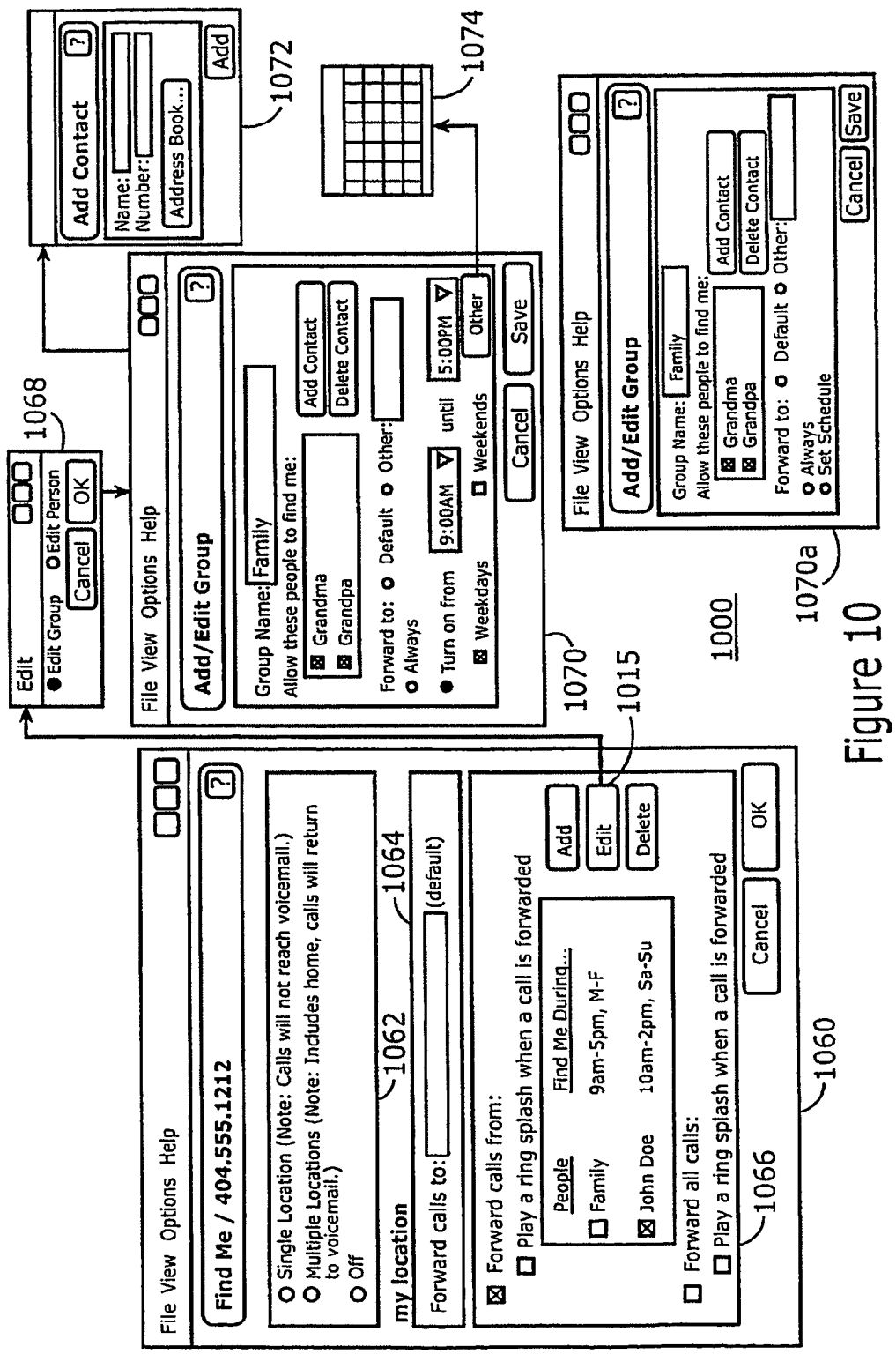

FIG. 10 is a schematic diagram illustrating various user interface option displays that may be generated responsive to selection of the Edit field 715 in the Find Me field 718 of the interface of FIG. 7. As shown in the embodiments of FIG. 10, selection of the Edit field generates the user display 1060. As shown in the input field 1062, single, multiple or no location may be generated for the Find Me function. At field 1064, a number or numbers may be provided for call forwarding associated with the Find Me function. In field 1066, options related to what calls to forward from particular users or all users are presented with John Doe shown as being enabled for the Find Me function between 10:00 a.m. and 2:00 p.m. on Saturdays and Sundays. A ring splash on call forwarding option is also shown. In addition to an Add and Delete field for field 1066, an Edit field 1015 may be selected, which may generate the Edit Group/Person user display 1068. When Edit Group is selected in the user display 1068, a user display 1070 may be generated showing options related to editing for a group "Family." The individuals to include in the Find Me function and the times to allow the Find Me function to operate for calls from those individuals are shown along with various selection options in the user display 1070. Similarly to the discussion of FIG. 9, the user display 1070*a* corresponds to the user display 1070 except for the selection of Always rather than set schedule on application of the Find Me function to the specified group members.

When Add Contact is selected from the user interface 1070, an Add Contact user display 1072 may be generated. Furthermore, also shown in FIG. 10 is a graphical calendar pop up window 1074 that may be used to facilitate entry of a specified time and day to allow the Find Me function to provide forwarding.

Figure 11:
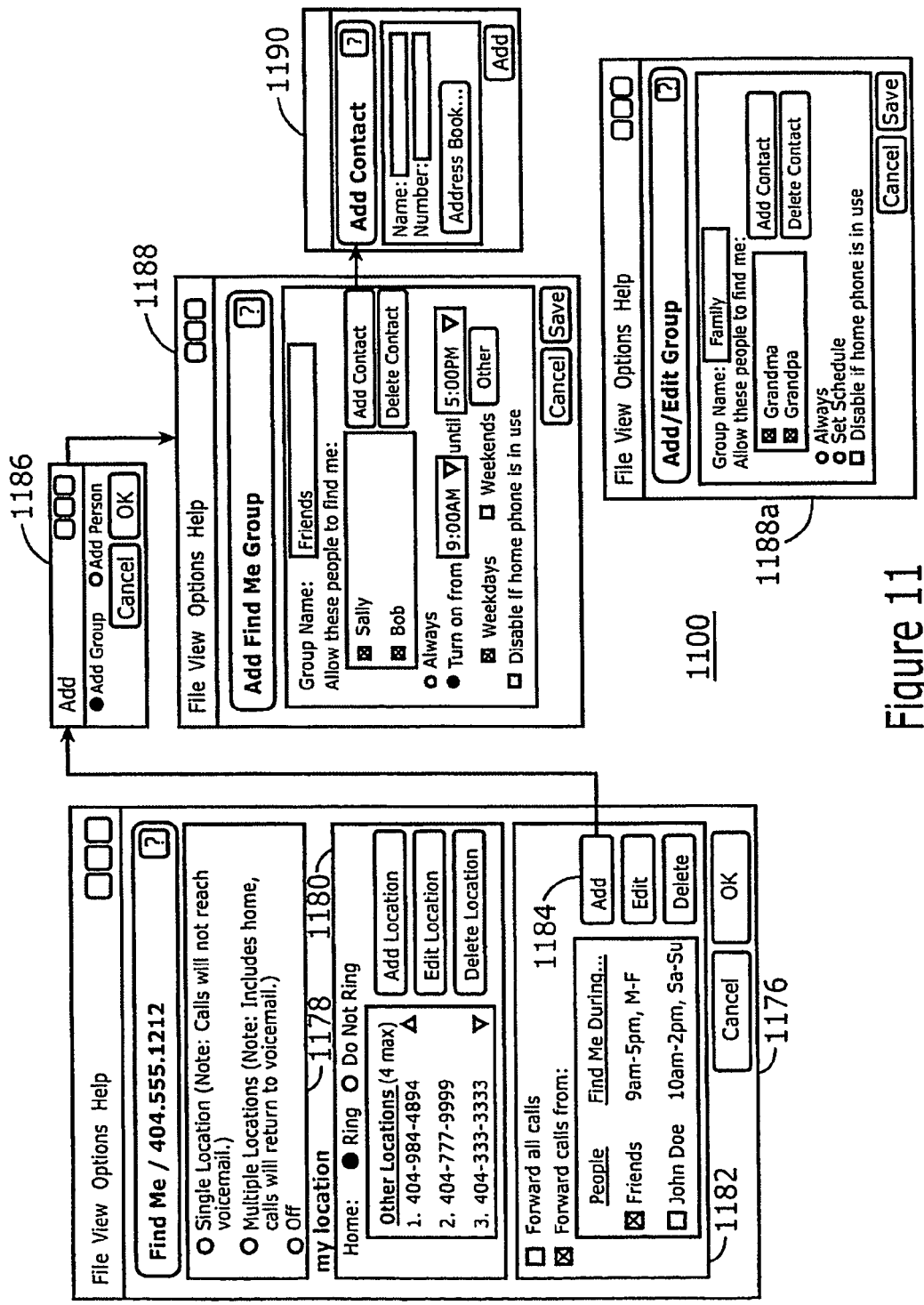

FIG. 11 is a schematic diagram showing user interfaces for an alternative configuration of the Find Me edit function as discussed previously with reference to FIG. 10. FIG. 11 differs from FIG. 10 in that the initial user display 1176 includes the selection of multiple locations in the field 1178. The other locations may be specified in the field 1180, while a designation of individuals to be provided to Find Me forwarding may be provided in field 1182.

Also shown in FIG. 11 is a sequence of displays associated with selection by a user of an Add field 1184 calling up an Add Group/Person user display 1186. Selection of the OK field in the user interface 1186 when Add Group is selected may provide a user display 1188, shown as allowing user configuration of a group name "Friends." The user display 1188*a* corresponds to the user display 1188 except with the Always rather than Set Schedule specification for the group being edited. When Add Contact is selected from the user display 1188, an Add Contact user display 1190 may be generated to add additional members to the group "Friends."

Figure 12:
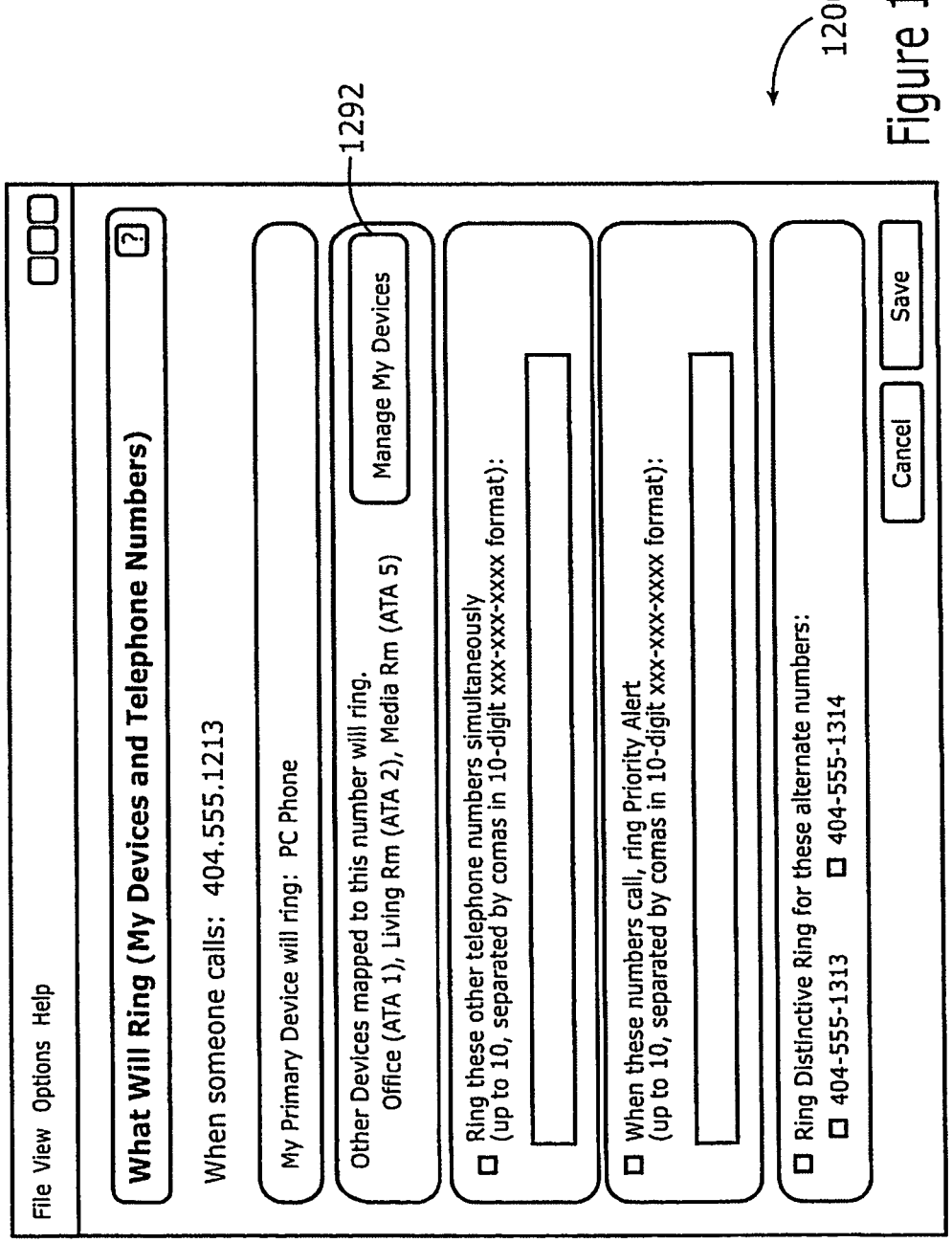

FIG. 12 illustrates an exemplary user display 1200 that may be generated responsive to selection of the Edit field 715 in the Will Ring field 720 of the user interface 700 of FIG. 7. As seen in the user display 1200, user configuration options are provided for actions to be taken when someone calls a number 404.555.1213. In addition to designating a primary device to ring, other telephone numbers to ring, a priority alert option and distinctive ring for particular alternate numbers, an Other Device Mapping field is shown in the embodiments of FIG. 12. When the Manage My Devices field 1292 is selected, a list of available devices that may be configured and linked to the communications service mapping may be generated for user selection. The list of devices may correspond to a list of devices generated by selection of the Media Settings field 609 of FIG. 6. As shown in FIG. 12, the number 404.555.1213 is currently mapped to a primary PC phone and three additional Voice over IP (VoIP) extensions ATA1, ATA2 and ATA5.

Figure 13:
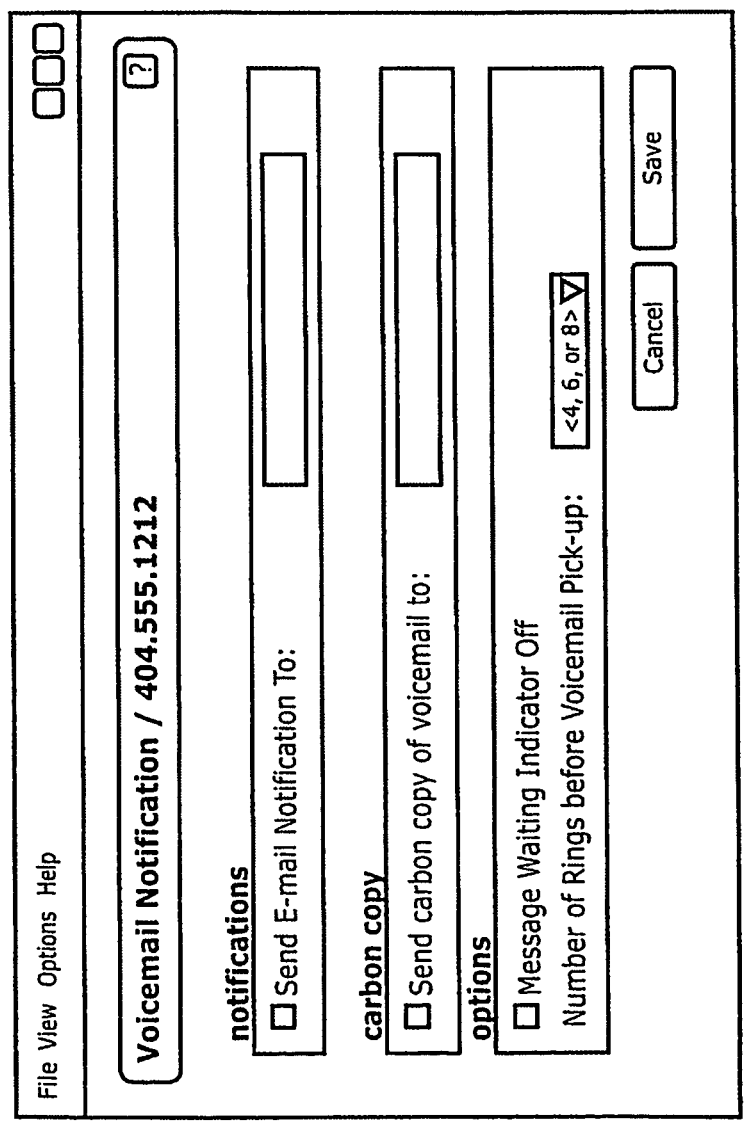
Figure 14:
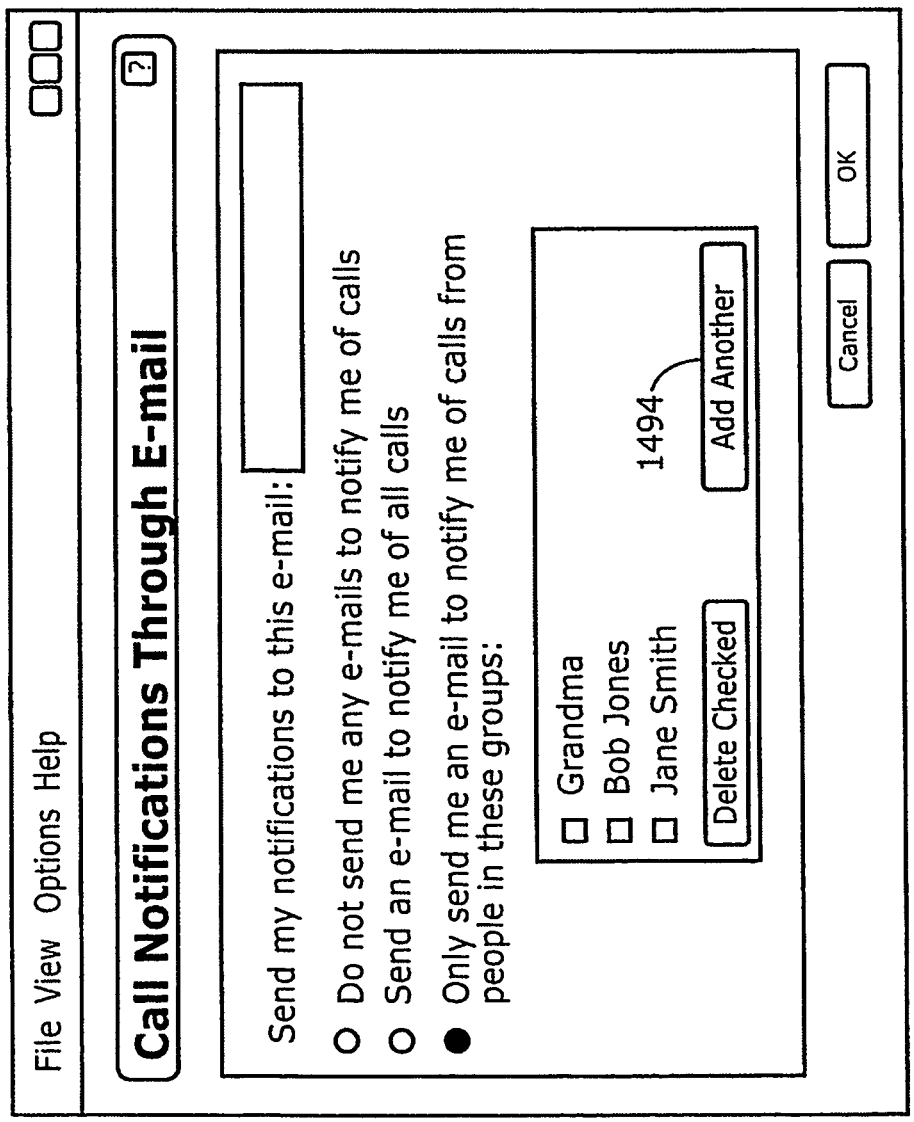

FIG. 13 is a schematic diagram illustrating a user interface 1300 that may be generated responsive to selection of the Edit field 715 in the Voicemail field 722 of FIG. 7. As shown in FIG. 13, various options for voicemail notifications when a voicemail has been received are presented to a user through the user display 1300. Similarly, FIG. 14 illustrates a user display 1400 that may be provided responsive to selection of the Edit field 715 in the E-mail Notification field 724 of FIG. 7. User interface 1400 provides a variety of options for e-mail notifications of calls, including selecting particular persons or groups for whom e-mail notifications will be provided and an Add Another field 1494 to add additional groups or individual persons to the list of designated individuals for e-mail notification.

It will be understood that at least a portion of the communications described herein can be provided according to Session Initiation Protocol (SIP), which is described in more detail in, for example, "Internet Communications Using SIP," by Henry Sinnreich, ISBN: 0-471-41399-2. Internet Protocol communications are generally described in, for example, "TCP/IP Protocol Suite," by Behrouz A Forouzan, ISBN: 0-07-119962-4. Moreover, techniques for the creation and operation of virtual communities, is described in, for example, "Design for Community: The Art of Connecting Real People in Virtual Places," by Derek M. Powazek, ISBN: 0-7357-1075-9. The content these references is incorporated herein by reference.

The communications used for messages may be provided using an Internet Protocol (IP) Multimedia Subsystem (IMS). IMS can utilize a packet switched domain (such as the Internet) to transport multimedia signaling and bearer traffic. The message forwarding may be provided, for example, via a Universal Mobile Telecommunication System (UMTS) to access multimedia services of IMS. IP Multimedia Systems are discussed in each of the following: (1) 3GPP TS 22.228 entitled "Service Requirements for the IP Multimedia Core Network Subsystems"; (2) 3GPP TS 23.228 entitled "IP Multimedia Subsystems"; and (3) 3GPP TR 22.941 entitled "IP Based Multimedia Services Framework." The subject matter of each of these references is hereby incorporated by reference.

It will be understood that messages can be provided via a TCP/IP Session Initiation Protocol (SIP) message, a SS7 (Signaling System 7) message, a common channel SS7 message, an in-band signaling message, and/or a Short Message Service (SMS) message, an Enhanced Message Service (EMS) message, a Multimedia Message Service (MMS) message, and/or Smartmessaging™ message. As is known to those skilled in the art, SMS and EMS messages can be transmitted on digital networks, such as GSM networks, allowing relatively small text messages (for example, 160 characters in size) to be sent and received via a network operator's message center to the user device, or via the Internet, using a so-called SMS (or EMS) "gateway."

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A computer implemented method of establishing settings of communications service features for a user, comprising:

identifying a plurality of communications services of the user, the plurality of communications services comprising an electronic mail service and a voice phone service;

defining a plurality of user selectable communications service scenarios for the user;

establishing settings for the plurality of communications services to provide established settings to be applied for the user upon selection of one of the scenarios, comprising settings related to received voice phone calls;

receiving a selection of one of the scenarios to provide a selected one of the scenarios; and automatically changing current settings of the communications service features for the user to the established settings for the selected one of the scenarios responsive to receiving the selection of the one of the scenarios, wherein the settings of the communications service features are associated with more than a status indicator and wherein the current settings remain the established settings for the selected one of the scenarios until the user selects another scenario from the plurality of user selectable communications service scenarios;

wherein defining a plurality of user selectable communications service scenarios and establishing settings comprises:

automatically detecting a pattern in a user's usage of the plurality of communications services of the user corresponding to one of the communications service scenarios for the user;

proposing a designation of user preferences for communications service features to be associated with a profile to be associated with the one of the scenarios based on the detected pattern;

receiving an acceptance of the proposed designation of user preferences; and translating the proposed designation of user preferences for the communications service features to communications system settings affecting the plurality of communications services of the user to establish the settings for the plurality of communications services to be applied for the user upon selection of the one of the scenarios.

2. The method of claim 1, wherein establishing settings comprises:

receiving a selection of one of the plurality of communications services to provide a selected one of the plurality of communications services;

receiving a designation of a profile to be associated with the selected one of the plurality of communications services to identify one of the user selectable communications service scenarios;

receiving a designation of user preferences for communications service features to be associated with the designated profile; and translating the user preferences for the communications service features to communications system settings affecting the plurality of communications services of the user to establish the settings for the plurality of communications services to be applied for the user upon selection of the one of the scenarios.

3. The method of claim 2, wherein one of the plurality of scenarios comprises a default scenario having an associated default profile.

4. The method of claim 3, wherein the features include call blocking, call filtering, call forwarding, voicemail and electronic mail notification.

5. The method of claim 4, wherein receiving a selection comprises receiving a selection of a telephone number of a communications service of the user.

6. The method of claim 5, wherein a plurality of telephone numbers are associated with communications services of the user and wherein receiving a selection includes displaying a list of the plurality of telephone numbers and receiving a selection of one of the displayed telephone numbers.

7. The method of claim 6, wherein receiving a designation of a profile includes displaying a list of profiles associated with the selected one of the displayed telephone numbers, an edit profile option and a new profile creation option.

8. The method of claim 5, wherein receiving a designation of user preferences for communications service features comprises:

displaying a user input menu comprising an identification of available features and a narrative description of current settings associated with the designated profile;

receiving a designation of activation of a selected one of the available features and a designation of one of the available features to be edited;

activating the selected one of the available features responsive to a designation of activation of the selected one of the available features;

displaying a user input menu comprising user options associated with the designated one of the available features responsive to a designation of the one of the available features to be edited; and receiving a designation of a user option responsive to display of the user input menu comprising user options.

9. The method of claim 8, wherein the selected one of the available features comprises call filtering and wherein the user options include designation of callers that will be announced to the user, designation of callers that will not he announced to the user or designation of callers to be associated with a group, wherein a group may be designated as a caller to be announced to the user or a caller that will not be announced to a user.

10. The method of claim 8, wherein the selected one of the available features comprises call forwarding and wherein the user options include designation of callers that will be forwarded to an alternative phone number, designation of the alternative phone number, designation of a ring tone to generate for forwarded calls or designation of callers to be associated with a group, wherein a group may he designated as a caller to be forwarded to the alternative phone number.

11. The method of claim 10, wherein the alternative phone number comprises a plurality of alternative phone numbers.

12. The method of claim 10, wherein the alternative phone number comprises a plurality of voice over Internet protocol devices mapped to a same phone number.

13. The method of claim 8, wherein the selected one of the available features comprises electronic mail notifications and wherein the user options include designation of an electronic mail address for electronic mail notifications, designation of callers that will trigger an electronic mail notification or designation of callers to be associated with a group, wherein a group may he designated as a caller that will trigger an electronic mail notification.

14. The method of claim 13, wherein an electronic mail notification is generated responsive to receipt of a call from a designated caller or responsive to receipt of a voicemail.

15. A computer system for establishing settings of communications service features for a user, comprising:
a processor, the processor comprising:
a service coordination module identifying a plurality of communications services of the user, the plurality of communications services comprising an electronic mail service and a voice phone service; and
a feature management interface module to define user selectable communications service scenarios for the user, establish settings for the plurality of communications services to provide established settings to be applied for the user upon selection of one of the scenarios, the established settings comprising settings related to received voice phone calls, and to receive a selection of one of the scenarios, wherein the service coordination module is to automatically change current settings of the communications service features for the user to the established settings responsive to receiving the selection of the one of the scenarios, wherein the settings of the communications service features are associated with more than a status indicator and wherein the current settings remain the established settings for the selected one of the scenarios until the user selects another scenario from the plurality of user selectable communications service scenarios;
wherein defining a plurality of user selectable communications service scenarios and establishing settings comprises:
automatically detecting a pattern in a user's usage of the plurality of communications services of the user corresponding to one of the communications service scenarios for the user;
proposing a designation of user preferences for communications service features to be associated with a profile to be associated with the one of the scenarios based on the detected pattern;
receiving an acceptance of the proposed designation of user preferences; and
translating the proposed designation of user preferences for the communications service features to communications system settings affecting the plurality of communications services of the user to establish the settings for the plurality of communications services to be applied for the user upon selection of the one of the scenarios.

16. A computer program product for establishing settings of communications service features for a user, the computer program product comprising computer program code embodied in a non-transitaty computer readable medium, the computer program code when executed by a processor causing the processor to perform operations comprising:
identifying a plurality of communications services of the user, the plurality of communications services comprising an electronic mail service and a voice phone service; and
defining user selectable communications service scenarios for the user, establish settings for the plurality of communications services to provide established settings to be applied for the user upon selection of one of the scenarios, comprising settings related to received voice phone calls, receive a selection of one of the scenarios, and to automatically change current settings of the communications service features for the user to the established settings responsive to receiving the selection of the one of the scenarios, wherein the settings of the communications service features are associated with more than a status indicator and wherein the current settings remain the established settings for the selected one of the scenarios until the user selects another scenario from the plurality of user selectable communications service scenarios;
wherein defining a plurality of user selectable communications service scenarios and establishing settings comprises:
automatically detecting a pattern in a user's usage of the plurality of communications services of the user corresponding to one of the communications service scenarios for the user;
proposing a designation of user preferences for communications service features to be associated with a profile to be associated with the one of the scenarios based on the detected pattern;
receiving an acceptance of the proposed designation of user preferences; and
translating the proposed designation of user preferences for the communications service features to communications system settings affecting the plurality of communications services of the user to establish the settings for the plurality of communications services to be applied for the user upon selection of the one of the scenarios.

17. The method of claim 1, wherein the plurality of user selectable communications service scenarios comprise at least three different scenarios.

18. The method of claim 17, wherein the plurality of user selectable communications service scenarios comprise do not disturb, vacation, and eating.

* * * * *

UNITED STATES PATENT AND TRADEMARK OFFICE
CERTIFICATE OF CORRECTION

| | | |
|---|---|---|
| PATENT NO. | : 8,655,333 B2 | Page 1 of 1 |
| APPLICATION NO. | : 11/411190 | |
| DATED | : February 18, 2014 | |
| INVENTOR(S) | : Newton et al. | |

It is certified that error appears in the above-identified patent and that said Letters Patent is hereby corrected as shown below:

In the Claims:

Column 14, Claim 9, Line 42:  Please correct "will not he"
                                      to read -- will not be --

Column 14, Claim 13, Line 66:  Please correct "may he designated"
                                        to read -- may be designated --

Signed and Sealed this
Eleventh Day of November, 2014

Michelle K. Lee
*Deputy Director of the United States Patent and Trademark Office*